United States Patent
Sjöland et al.

(10) Patent No.: US 12,328,674 B2
(45) Date of Patent: Jun. 10, 2025

(54) PREAMBLE SIGNAL FOR WAKEUP COMMUNICATION IN A WIRELESS COMMUNICATION SYSTEM

(71) Applicant: Telefonaktiebolaget LM Ericsson (publ), Stockholm (SE)

(72) Inventors: Henrik Sjöland, Lund (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 17/786,515

(22) PCT Filed: Dec. 20, 2019

(86) PCT No.: PCT/EP2019/086702
§ 371 (c)(1),
(2) Date: Jun. 16, 2022

(87) PCT Pub. No.: WO2021/121625
PCT Pub. Date: Jun. 24, 2021

(65) Prior Publication Data
US 2023/0032217 A1    Feb. 2, 2023

(51) Int. Cl.
*H04L 27/02* (2006.01)
*H04W 52/02* (2009.01)

(52) U.S. Cl.
CPC ......... *H04W 52/0229* (2013.01); *H04L 27/02* (2013.01)

(58) Field of Classification Search
None
See application file for complete search history.

(56) References Cited

U.S. PATENT DOCUMENTS

| 9,867,155 B1* | 1/2018 | Tertinek .............. H04W 56/003 |
| 2014/0079164 A1 | 3/2014 | Zhang et al. |

(Continued)

FOREIGN PATENT DOCUMENTS

| CN | 103109567 A | 5/2013 |
| CN | 110086489 A | 8/2019 |

(Continued)

OTHER PUBLICATIONS

Bryant, Carl, et al., "A 2.45GHz, 50uW Wake-up Receiver Front-end with -88dBm Sensitivity and 250kbps Data Rate", Proceedings of European Solid State Circuits Conference (ESSCIRC), 2014, 235-238.

(Continued)

*Primary Examiner* — Kodzovi Acolatse
(74) *Attorney, Agent, or Firm* — Murphy, Bilak & Homiller, PLLC (57) ABSTRACT

A method performed in a base station for frequency calibration of a receiver is disclosed. The base station generates a first signal with periodic ASK modulation and transmits the first signal as a preamble or frequency marker signal to facilitate frequency calibration of the receiver. The receiver sweeps its oscillator frequency to detect if there is a preamble or frequency marker signal present. When it is determined that there is a signal present, the oscillator frequency of the receiver is calibrated to the transmitting frequency of the base station. The base station then transmits a second signal as a wakeup signal to the receiver.

13 Claims, 7 Drawing Sheets

---

210. Generate a first signal with periodic ASK/OOK modulation

220. Transmit the first signal as a calibration signal

230. Transmit a second signal as a wakeup signal (56) References Cited

U.S. PATENT DOCUMENTS

| | | | |
|---|---|---|---|
| 2017/0048091 A1 | 2/2017 | Mcdermott et al. | |
| 2018/0007629 A1* | 1/2018 | Dorrance | H04W 52/0229 |
| 2018/0249413 A1* | 8/2018 | Sun | H04W 52/0229 |
| 2019/0166556 A1* | 5/2019 | Ly | H04B 7/0695 |
| 2019/0166557 A1* | 5/2019 | Chen | H03F 3/45179 |
| 2019/0200311 A1* | 6/2019 | Liu | H04W 52/028 |
| 2019/0387469 A1 | 12/2019 | Wilhelmsson et al. | |

FOREIGN PATENT DOCUMENTS

| | | | | |
|---|---|---|---|---|
| EP | 0788265 | A2 | 8/1997 | |
| EP | 1204234 | A2 | 5/2002 | |
| EP | 1220505 | A2 | 7/2002 | |
| EP | 3503629 | A1 * | 5/2019 | H04L 7/0083 |
| JP | 2000013355 | A | 1/2000 | |
| WO | 2018174941 | A1 | 9/2018 | |
| WO | 2019030337 | A1 | 2/2019 | |

OTHER PUBLICATIONS

Huang, Xiongchuan, et al., "Noise and Sensitivity in RF Envelope Detection Receivers", IEEE Transactions on Circuits and Systems-II: Express Briefs, vol. 660, No. 10, Oct. 2013, 637-641.

Jha, Uma S., "Acquisition of Frequency Synchronization for GSM and its Evolution Systems", Personal Wireless Communications, IEEE International Conference, Dec. 17-20, 2000, 558-562.

Jnknown, Author, "UE Power Saving and Wakeup Mechanism", 3GPP TSG RAN Meeting #78, RP-172373, Lisbon, Portugo, Dec. 18-21, 2017, 1-14.

* cited by examiner

PREAMBLE SIGNAL FOR WAKEUP COMMUNICATION IN A WIRELESS COMMUNICATION SYSTEM

TECHNICAL FIELD

Embodiments herein relate to a wireless communication device, a base station and methods therein for wakeup communication in a wireless communication system. In particular, the embodiments herein relate to methods for frequency calibration of a wakeup receiver in the wireless communication device.

BACKGROUND

There is a strong trend in wireless communication systems towards supporting devices with ultra-low power consumption. These devices may be small sensor nodes where a battery should last many years, or where energy scavenging is used to achieve battery-less operation. When the wireless communication system is to communicate with such devices a receiver must be operated in the device. To achieve a short response time, the receiver must be operated regularly. The power consumption of the receiver must then be limited. A special ultra-low power dedicated receiver, so called wakeup receiver, is thus often used. However, the capabilities of the wakeup receiver are limited, and it is only able to detect the presence of a wakeup request. When such a request is present a higher performance and higher power main receiver is started to be able to receive the actual communication.

To achieve ultra-low power consumption, e.g. below 100 uW, the wakeup receivers are often based on amplitude detection of on-off keying (OOK) signals. Generation of accurate local oscillator (LO) signals using power hungry Phase Locked Loops (PLLs) can thereby be avoided. However, since the frequency of the LO signal from a free-running oscillator is not accurate, only modest filtering can be realized prior to amplitude detection.

Due to the limited amount of filtering prior to amplitude detection the wakeup receivers are very vulnerable to interference. All interference and noise entering the amplitude detector having amplitude modulation in the same frequency range as the wakeup signal will mask the wakeup signal. It should here be understood that the same frequency does not imply that the interference is sent using the same frequency channel. Instead, because of the limited ability to filter out signals adjacent to the wakeup signal, it should be understood that also signals transmitted in adjacent frequency channels and potentially even further away will effectively have as detrimental effect as a co-channel interferer. Alternatively, to be able to effectively filter out adjacent interference, the frequency generation must have high accuracy and consume significant power. Furthermore, the amplitude detector is also heavily non-linear and therefore produces very small outputs for weak input signals. Assuming the amplitude detector has a quadratic characteristic for small signals means that the signal to noise ratio falls off by 20 dB for each reduction of 10 dB of the input signal level. This becomes quickly very unfavorable already with modest amounts of interference at the detector input, as the presence of interference will limit how much the input signal can be amplified. More filtering prior to the amplitude detection is therefore necessary to achieve wakeup receivers with high immunity to interference. However, to employ such filtering an accurate frequency LO signal is needed, so means to create such signals with low power consumption must thus be provided.

SUMMARY

It is therefore an object of embodiments herein to provide a method for a wakeup receiver to generate and calibrate oscillator signals in a wireless communication system.

According to a first aspect of embodiments herein, the object is achieved by a method performed in a base station for facilitating frequency calibration of a receiver. The base station generates a first signal with periodic Amplitude Shift Keying (ASK) modulation and transmits the first signal as a calibration signal to the receiver to facilitate frequency calibration of the receiver. The base station then transmits a second signal as a wakeup signal to the receiver.

According to a second aspect of embodiments herein, the object is achieved by a method performed in a wakeup receiver. The wakeup receiver has an envelope detector based architecture. The wakeup receiver comprises at least a frequency down-conversion mixer, a digitally control oscillator (DCO) configured to generate oscillator signals, a first filter with programmable bandwidth, an envelope detector, a second filter with programmable bandwidth and a digital processing and control unit configured to determine if a signal is present and generate a frequency control signal to the DCO and bandwidth control signals to the first and second filters.

The wakeup receiver is set to a first bandwidth by choosing digital settings of the bandwidth control signals to the first and second filters to receive a first signal transmitted by a base station. The first signal is a periodic ASK modulation signal and transmitted for facilitating frequency calibration of the receiver.

The wakeup receiver operates the DCO at different frequencies by sweeping digital settings of the frequency control signal and detects if there is a signal present for each digital setting of the frequency control signal.

The wakeup receiver then stores the digital setting of the frequency control signal when a signal is detected.

The wakeup receiver may be set to a second bandwidth and sweeping the digital settings of the frequency control signal to detect if there is a signal present, wherein the second bandwidth is narrower than the first bandwidth.

According to the embodiments herein, the base station generates a first signal with periodic ASK modulation, e.g. OOK modulation, and transmits the first signal as a preamble or frequency marker signal to facilitate frequency calibration of the receiver. The first signal may be transmitted at or close to the frequency where a wakeup signal is to be transmitted. The receiver sweeps its oscillator frequency to detect if there is a preamble or frequency marker signal present, and at what oscillator frequency setting. When it is determined that there is a signal present, at the corresponding frequency setting, the oscillator frequency of the receiver is calibrated to the transmitting frequency of the base station. The base station then transmits a second signal as a wakeup signal to the receiver. The receiver receives the wakeup signal using the frequency calibrated oscillator.

The signal with periodic ASK/OOK modulation allows a fast acquisition of its frequency, under different signal conditions. The method performed in the wakeup receiver provides a scheme where the receiver may perform a fast frequency sweep to search for preamble signals, followed by a more sensitive selective search at frequencies where preamble signal tones are detected in the first sweep. The properties of ASK/OOK signals allow the frequency to be swept without disrupting reception, while filtering the receiver amplitude demodulated output to find preamble or marker signal frequency tones. After the frequency sweeping, the wakeup receiver oscillator is calibrated to the frequency of the preamble signal. The use of the first signal transmitted by the base station as frequency markers or preambles allows the receiver to use a free-running oscillator with lower power consumption, while still being narrowband for high selectivity.

By using this solution, an ultra-low power wakeup receiver with accurate oscillator frequency generation may be realized and this allows a narrow bandwidth filter to be used, resulting in high selectivity. The combination of ultra-low power and high selectivity is very attractive.

Therefore, the embodiments herein provide an improved method for a wakeup receiver to generate high accuracy oscillator signals by calibrating the frequency of a free-running oscillator based on a preamble signal, which results in an ultra-low power and high selectivity wakeup receiver.

BRIEF DESCRIPTION OF THE DRAWINGS

Examples of embodiments herein are described in more detail with reference to attached drawings in which.

DETAILED DESCRIPTION

Figure 1:
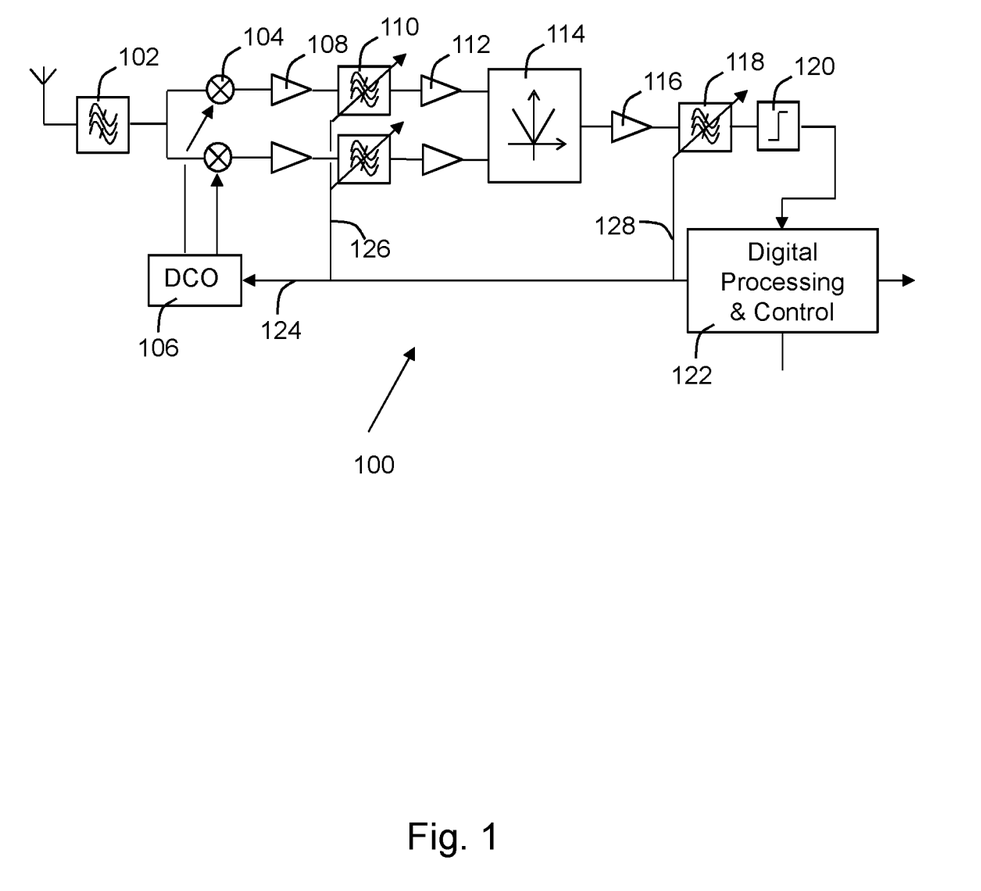
FIG. 1 is a schematic block diagram showing a wakeup receiver architecture in which a method for frequency calibration according to the embodiments herein may be implemented.

FIG. 1 shows an example of a wakeup receiver 100 with an envelope detector based architecture. As can be seen the wakeup receiver 100 comprises a band select filter 102 for filtering RF signals received at an antenna, a frequency down-conversion mixer 104 configured to convert the received RF signals to baseband or intermediate frequency (IF) signals, a digitally controlled oscillator DCO 106 configured to generate oscillator signals to the mixer 104. After the mixer 104 comes baseband/IF amplification and filtering. The wakeup receiver 100 may further comprise a first baseband/IF amplifier 108, a first baseband/IF filter 110 with programmable bandwidth, a second baseband/IF amplifier 112 and an envelope detector 114. Since the frequency is low at this point, sharp filtering in the first baseband/IF filter 110 may be applied to minimize interference reaching the envelope detector 114. The wakeup receiver 100 may further comprise a third amplifier 116 after the envelope detector 114 and a second baseband/IF filter 118 with programmable bandwidth. Then either an Analog to Digital Converter (ADC) or a simple comparator 120 is used to convert the baseband/IF signals to digital signals, in the form of, e.g. a bit sequence. The wakeup receiver 100 further comprise a digital processing and control unit 122 configured to receive the digital signals and determine if a signal is present and generate a frequency control signal 124 to the DCO 106 and bandwidth control signals 126, 128 to the first and second filters 110, 118, respectively.

The DCO 106 is the core and major power consumer of the wakeup receiver 100. For achieving ultra-low power consumption, a ring oscillator may be used. When it comes to the mixer 104 a passive structure is attractive to minimize power consumption and flicker noise.

Using a comparator produces a single bit, compared to an ADC that may create a multiple bit representation of the signal. The comparator, however, is very low power and being single-bit eliminates the need for Automatic Gain Control (AGC), making it very suitable to ultra-low power receivers.

According to the embodiments herein, a signal is transmitted to aid the wakeup receiver 100 to tune its DCO 106 frequency. The modulation of this aiding signal may be ASK, e.g. OOK, with a periodic modulation pattern. A method performed in a base station to facilitate frequency calibration of the wakeup receiver 100 will now be described with reference to FIG. 2. The method comprises the following actions.

Action 210

Figure 2:
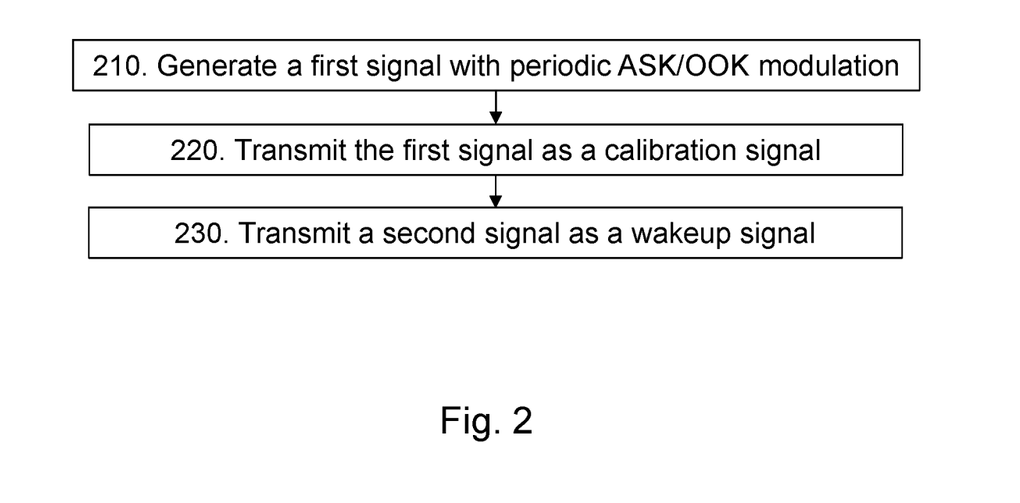
FIG. 2 is a flow chart illustrating a method performed in a base station according to embodiments herein.

The base station generates a first signal with periodic ASK, e.g. OOK, modulation. By using an ASK/OOK aiding signal, which only has information in the amplitude, the DCO frequency of the wakeup receiver 100 may be quickly stepped or continuously swept without distorting the received signal notably.

There are different options for the ASK/OOK modulation. The first is to use a single tone modulation, with a relatively high frequency of about e.g. 1 MHz. A second option may be to use a lower frequency tone modulation and a third option may be to generate ASK/OOK modulation containing two strong frequency tones, one at lower frequency and one at higher frequency. The ASK/OOK signal containing more than one strong modulation frequency components may still lend itself well to single-bit representation in a power efficient ASK/OOK receiver. To achieve this, effectively a high frequency harmonic may be boosted by replacing each zero crossing in a fundamental frequency square wave with a wavelet of a square wave of the harmonic frequency.

So according to some embodiments herein, the first signal with periodic ASK/OOK modulation may contain a first and a second frequency modulation tones. The OOK signal with multi-tone content may be created by starting from a square wave with the lower frequency. Each zero crossing is then replaced by a piece of a square wave, i.e. a wavelet with the higher frequency, thereby forming multiple zero-crossings to increase the high frequency content of the signal.

So according to some embodiments herein, the first signal may be a periodic OOK signal and may be generated by replacing each zero crossing in a square wave of the first frequency with a wavelet of a square wave of the second frequency.

Action 220

The base station transmits the first signal as a calibration signal to the receiver to facilitate frequency calibration of the wakeup receiver 100.

The first signal may be used as a preamble to a wakeup signal and may be transmitted at or close to the frequency where the wakeup signal is to be transmitted. The first signal is transmitted for long enough time so that the wakeup receiver 100 is likely to find it, and then the actual wakeup signal may be transmitted at the same frequency as the first signal frequency.

Action 230

The base station transmits a second signal as a wakeup signal to the wakeup receiver 100.

The second signal may be transmitted at the same frequency as the first signal after a time period from the first signal has been transmitted.

An alternative is to transmit the first signal, and then after some time transmit the wakeup signal at an adjacent frequency, while still transmitting the first signal. If not acknowledged by a target device, e.g. the wakeup receiver 100, the transmission of the first signal may then continue while more attempts to contact the target device are made by transmitting wakeup signals. The first signal is in this case used as a frequency marker, indicating the frequency location of the wakeup signal.

Therefore according to some embodiments herein, the first signal may be transmitted continuously and the second signal may be transmitted when a receiver wakeup is to be requested.

According to some embodiments herein, the first signal may be a first frequency marker signal and the second signal may be transmitted at a frequency offset from the first frequency marker signal.

To support the calibration over a larger frequency range and increase the precision of the calibration, two or more frequency marker signals with different frequencies may be transmitted. For example, a second frequency marker signal may be transmitted, for instance at the other side of the wakeup signal frequency. Variations in frequency tuning sensitivity of the DCO in the wakeup receiver 100 may then be compensated for, which otherwise may cause some uncertainty when offsetting the DCO frequency from the first marker signal frequency to wakeup signal frequency location.

Figure 3:
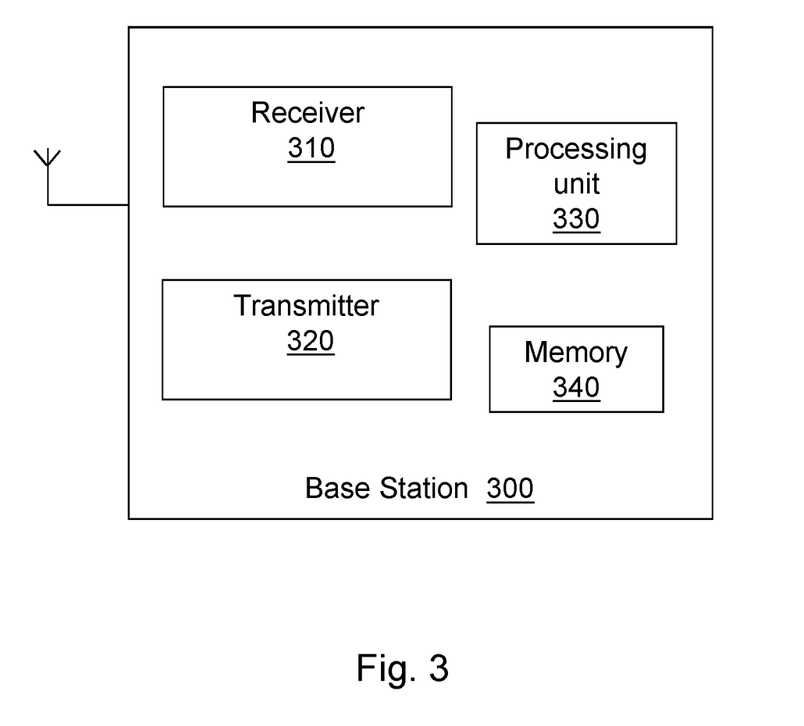
FIG. 3 is a schematic block diagram illustrating an embodiment of a base station in which a method according to the embodiments herein may be implemented.

FIG. 3 shows a block diagram of a base station 300. The base station 300 comprises e.g. a receiver 310, a transmitter 320, a processing unit 330, a memory 340 etc. The base station 300 is configured to perform the Actions 210-230 described above.

Figure 4:
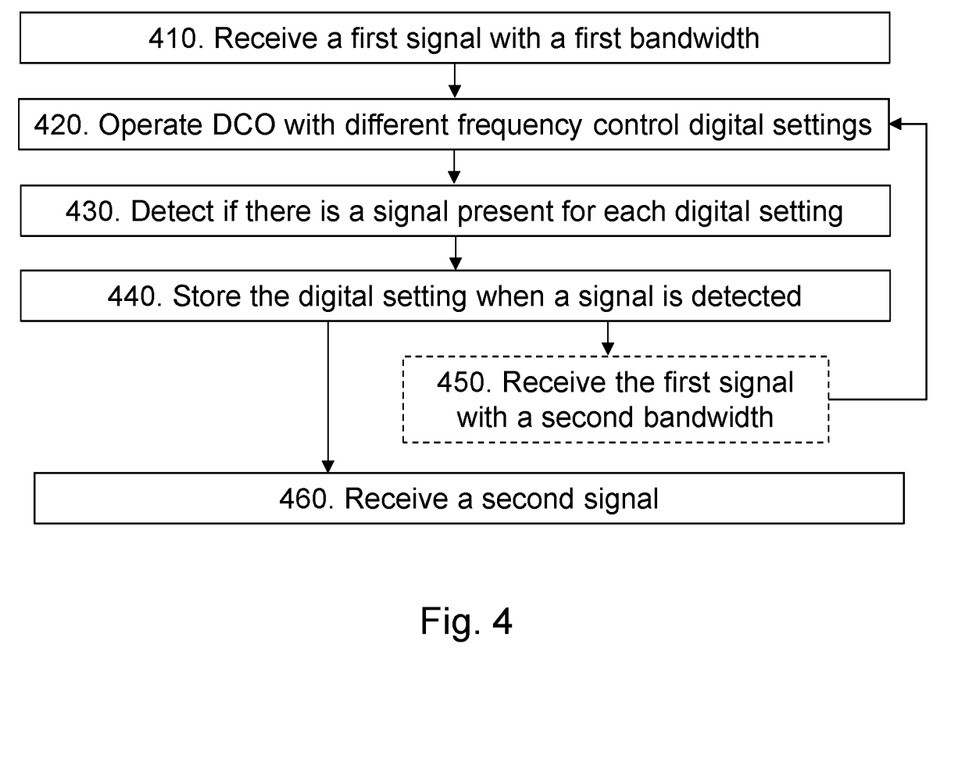
FIG. 4 is a flow chart illustrating a method performed in a wakeup receiver according to embodiments herein.

According to the embodiments herein, a method performed in the wakeup receiver 100 for frequency calibration and receiving signals will now be described with reference to FIG. 4. The method comprises the following actions which may be performed in any suitable order.

Action 410

The wakeup receiver 100 is set to a first bandwidth by choosing digital settings of the bandwidth control signals 126, 128 to the first and second filters 110, 118 to receive a first signal. The first signal is a periodic ASK, e.g. OOK modulation signal and transmitted for facilitating frequency calibration of the wakeup receiver 100.

Action 420

The wakeup receiver 100 operates the DCO 106 at different frequencies by sweeping digital settings of the frequency control signal 124 to detect if there is a signal present.

The wakeup receiver 100 sweeps its DCO frequencies, while filtering the output signal from the envelope detector 114 for detecting tones of an OOK modulation signal. To facilitate a fast acquisition of the oscillator frequency, a procedure with two frequency sweeps may be performed. A first frequency sweep may be performed with a wider baseband/IF filter bandwidth, to allow for a faster frequency sweep with more frequency shift during modulation tone detection, since if a higher frequency modulation tone is used, the bandwidth of the signal becomes wider. The digital processing and control unit 122 may therefore set the bandwidth of the first baseband/IF filter 110. After the first baseband/IF filter 110 the signal is envelope detected, and then again filtered by a second baseband/IF filter 118 and amplified. Also this second baseband/IF filter 118 may be programmable depending on what tone is to be detected, or if the actual wakeup signal is to be received.

Action 430

The wakeup receiver 100 detects if there is a signal present for each digital setting of the frequency control signal 124. The result of the sweep, i.e. detected tone amplitudes versus DCO frequency settings, are stored in a memory. Narrowband digital filters may then be used to find the amplitude of the OOK tone for further contributing to the filtering after the detector, and store the filtered result in a memory, to determine if there is a signal present or not. If the actual wakeup signal is to be received, a correlator may instead be used to find the corresponding bit sequences.

Action 440

The wakeup receiver 100 stores the digital setting of the frequency control signal 124 when a signal is detected. That is, for this digital setting, the detected tone amplitude is above a threshold and it is determined that a signal is present. In this way, the DCO is calibrated to the frequency of the first signal.

Action 450

This action is optional. The wakeup receiver 100 may be set to a second bandwidth and sweeping the digital settings of the frequency control signal to detect if there is a signal present, wherein the second bandwidth is narrower than the first bandwidth.

The first frequency sweep will be relatively faster, which combined with the higher bandwidth will result in reduced sensitivity. The first sweep in this case is made to try to find the frequency marker or preamble signal, and where when it is found that a signal is stronger than an average, i.e. a noise level, it may be desired to make a closer examination, i.e. a second search, with a slower sweep. So for those DCO frequencies where the detected amplitude is significantly stronger than an average, if any, a second search may be performed using a lower baseband/IF filter bandwidth. The sensitivity will then be higher, and it will be possible to detect with higher certainty the existence of the marker or preamble signal. In case the signal conditions are good, however, the sensitivity of the first sweep may be sufficient for the decision.

The effective bandwidth of a receiver is equal to the geometric mean of the bandwidths of the first and second filters 110, 118, given that the filtering after the detector, i.e. the second filter 118, is more narrowband. To effectively improve sensitivity thus both filters bandwidths should be reduced at the same time. Only reducing the bandwidth of one filter will not be as effective, as a reduction of 4 times is required for a 3 dB improvement. In contrast, when both filters bandwidths are reduced together, 4 times reduction of bandwidth for each one of the filters results in 6 dB improvement of the receiver sensitivity.

Multiple sweeps, full sweeps as well as partial sweeps, may be performed using different filter bandwidths, i.e. with different sensitivities and scanning speeds, before a decision is taken as to what DCO digital setting of the frequency control signal to use for receiving the wakeup signal. The DCO frequency generation may then be both accurate and low power since the free running oscillator in the wakeup receiver is calibrated to the transmitting frequency of the base station.

Action 460

After the calibration, the wakeup receiver 100 may receive a second signal transmitted by a base station as a wake up signal.

When the wakeup signal is transmitted at the same frequency as the first signal, the wakeup receiver 100 may operate the DCO with the digital setting of the frequency control signal where the first signal is detected to receive the second signal.

When the wakeup signal is transmitted at a frequency offset from the first signal, the wakeup receiver 100 may operate the DCO with a digital setting offset from the digital setting of the frequency control signal where the first signal is detected to receive the second signal.

When two or more of the first signals are transmitted at different frequencies from the base station, the wakeup receiver 100 may operate the DCO with a digital setting calculated from two or more digital settings achieved when two or more of the first signals with different frequencies are detected, to receive the second signal. The calculation may be interpolation or extrapolation from the two or more digital settings, which allows operating the DCO at a frequency not only between the frequency markers, i.e. interpolation, but also outside the frequency markers, i.e. extrapolation.

The embodiments herein are described with the wakeup receiver 100 as an example architecture of a receiver where e.g. a simple comparator is used, however, the embodiments herein are also applicable in different receiver architectures, e.g. where an ADC may be used. That is, the transmission of a preamble signal makes it feasible for wakeup receivers with any type of architecture to employ power efficient and accurate frequency generation.

The wakeup receiver 100 may be implemented in a wireless communication device. The wireless communication device may be a device with ultra-low power consumption, such as small sensor nodes, or any of a wireless communication terminal, a user equipment, a Machine Type Communication (MTC) device, a Device to Device (D2D) terminal, or any type of node in the wireless communication system, e.g. smart phone, laptop, mobile phone, relay, mobile tablets or even a small base station communicating within a cell. According to the embodiments herein, the wakeup receiver 100 may be configured to perform any one or all of the method steps or Actions 410-460 described above.

Figure 5:
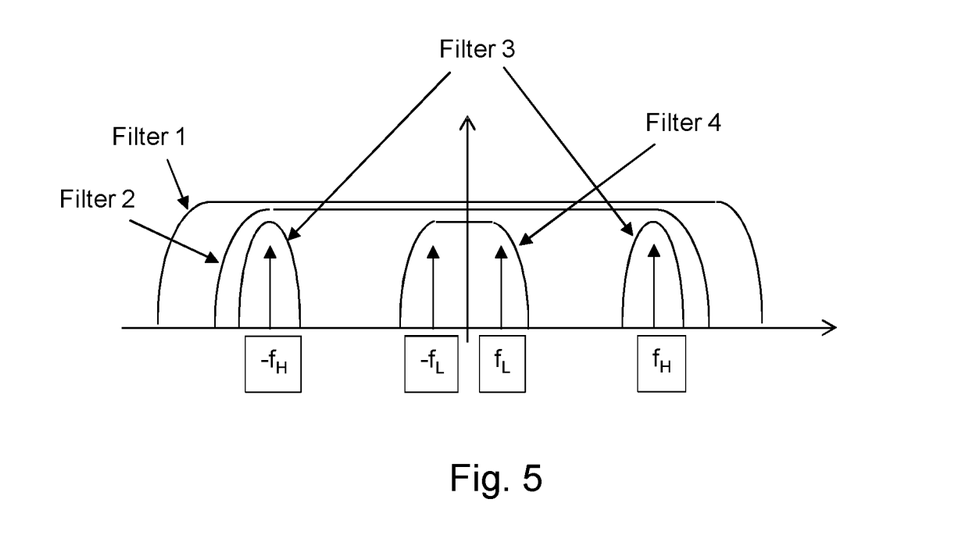
FIG. 5 is a diagram showing spectrums with low and high frequency modulation tones, and different filter options.

To detect the signal with different OOK modulations, there are different bandwidth settings for the wakeup receiver 100. A simplified spectrum of the different modulation signal options and filter options is shown in FIG. 5.

The task of the baseband/IF filter is to pass the modulation tones, with sufficient margins to allow for short term oscillator drift, and in case of performing a frequency sweep, margin to allow for frequency shift during post detector filter settling. Some different filter options are indicated in FIG. 5. Filter 1 selects both the low frequency and high frequency tones plus some margin for sweep frequency shift. This is suitable for the fast sweep if either the low frequency tone, high frequency tone, or both tones are used in OOK modulation signal. Filter 2 is similar to filter 1, but a bit less wideband. It is suitable for the second sweep to detect the high frequency tones and if present also for the lower frequency tones, or for the fast sweep to detect the lower frequency tones. Filter 3 is tailored to the second sweep to detect the high frequency tones, and thanks to its narrower bandwidth and rejection of potential low frequency interference, it will provide increased receiver sensitivity compared to using Filter 2. Filter 4 is suitable for the second sweep to detect the low frequency tones. Not indicated in the figure is notching of DC, which may be performed with Filters 1, 2, 4 to eliminate DC offsets.

For example, for a single tone OOK modulation, with a relatively high frequency of say about 1 MHz, a baseband/IF bandwidth of e.g. four times the modulation tone frequency may create sufficient margin to allow a high scanning speed in the first sweep. In the second sweep, where different frequency tuning settings are tried individually, a much tighter filtering may be used. If a homodyne receiver is used, bandpass filters may then be used around the modulation frequency.

For a single tone OOK modulation with a relatively lower frequency tone modulation, in the second sweep a narrower band low-pass filter may be used, which is less complex than the bandpass filter. However, at lower frequencies there is an increased risk for noise and disturbances.

For a signal with OOK modulation containing two strong tones, one at lower frequency and one at higher frequency, it is then possible for the wakeup receiver 100 to choose which tone frequency to search for, and what baseband/IF filters to implement. The drawback of the two-tone modulation signal is that transmitting with the same power as for the single tone signal, each tone will have slightly less signal strength. A benefit of the dual tone signal, however, is that it reduces the risk for errors in the wakeup receiver, by ensuring presence of both tones, for instance by detecting the higher frequency tones in the first sweep and the lower one in the second sweep.

Figure 6:
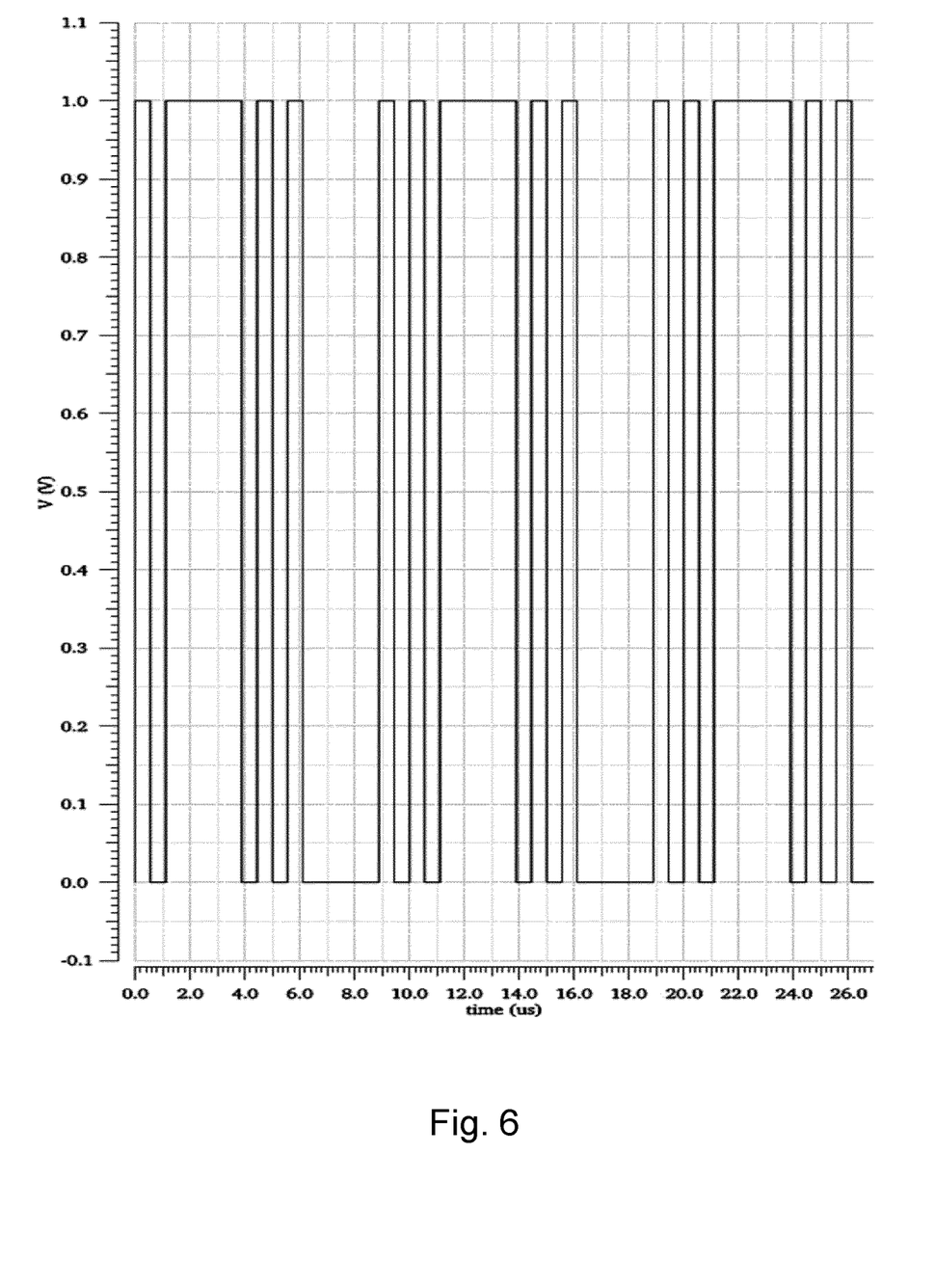
FIG. 6 is a diagram showing an OOK waveform with two strong tones.

To maximize the performance of detecting the preamble/marker signal with two-tone when processed by the single-bit wakeup receiver 100, the OOK modulations should have an effective average level of 50%, both in the high frequency regions and over a longer time interval corresponding to a period of the low frequency tone. This will maximize the noise margins of the two detected amplitude levels corresponding to digital zero and digital one for both tones. FIG. 6 shows such a composite OOK waveform with two strong tones, where a fundamental tone is at 100 kHz and a 9th harmonic tone is at 900 kHz. As can be seen filtering out the DC of 0.5 in the waveform will result in clear decisions for both 0 and 1 for both the high and low frequency tones.

Figure 7:
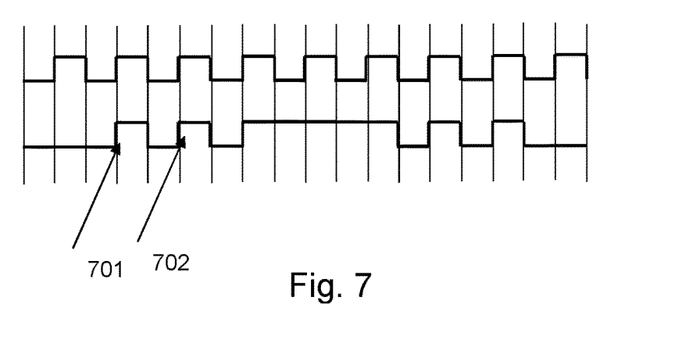
FIG. 7 is a diagram showing a 9th harmonic waveform and one period of the composite waveform of FIG. 6.

FIG. 7 shows an amplitude waveform of a 9th harmonic, i.e. the square wave shown on top, together with one period of the composite waveform of FIG. 6, i.e. the waveform shown at bottom, equidistant time markers are also drawn in the figure. As can be seen all edges are aligned with the equidistant time markers, so additional oversampling beyond what is required by the 9th harmonic is not necessary. It can also be observed that all wavelets e.g. indicated by reference number 701, 702, in the composite waveform are in phase with the 9th harmonic square wave, resulting in maximum magnitude of this frequency component in the composite waveform.

Figure 8:
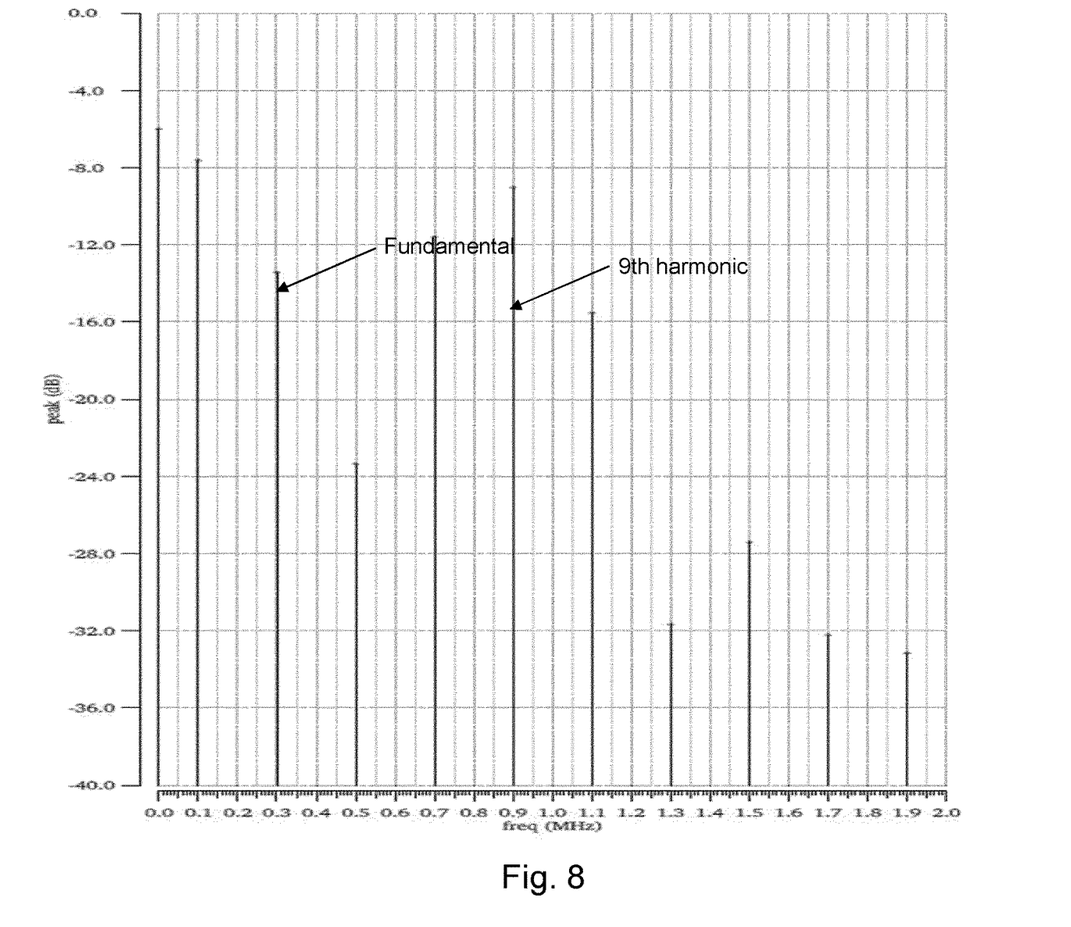
FIG. 8 is a diagram showing the frequency spectrum of the waveform in FIG. 6.

FIG. 8 shows the frequency spectrum of the waveform in FIG. 6, which shows strong power at both the fundamental and the 9th harmonic. As can be seen, the waveform contains DC, the fundamental tone and the odd order harmonics only. The 9th harmonic is the strongest of the odd order harmonics and has similar magnitude as the fundamental. So the OOK signal may contain more than one strong modulation frequency tone, while still lending itself well to single-bit representation in a power efficient OOK receiver.

Figure 9:
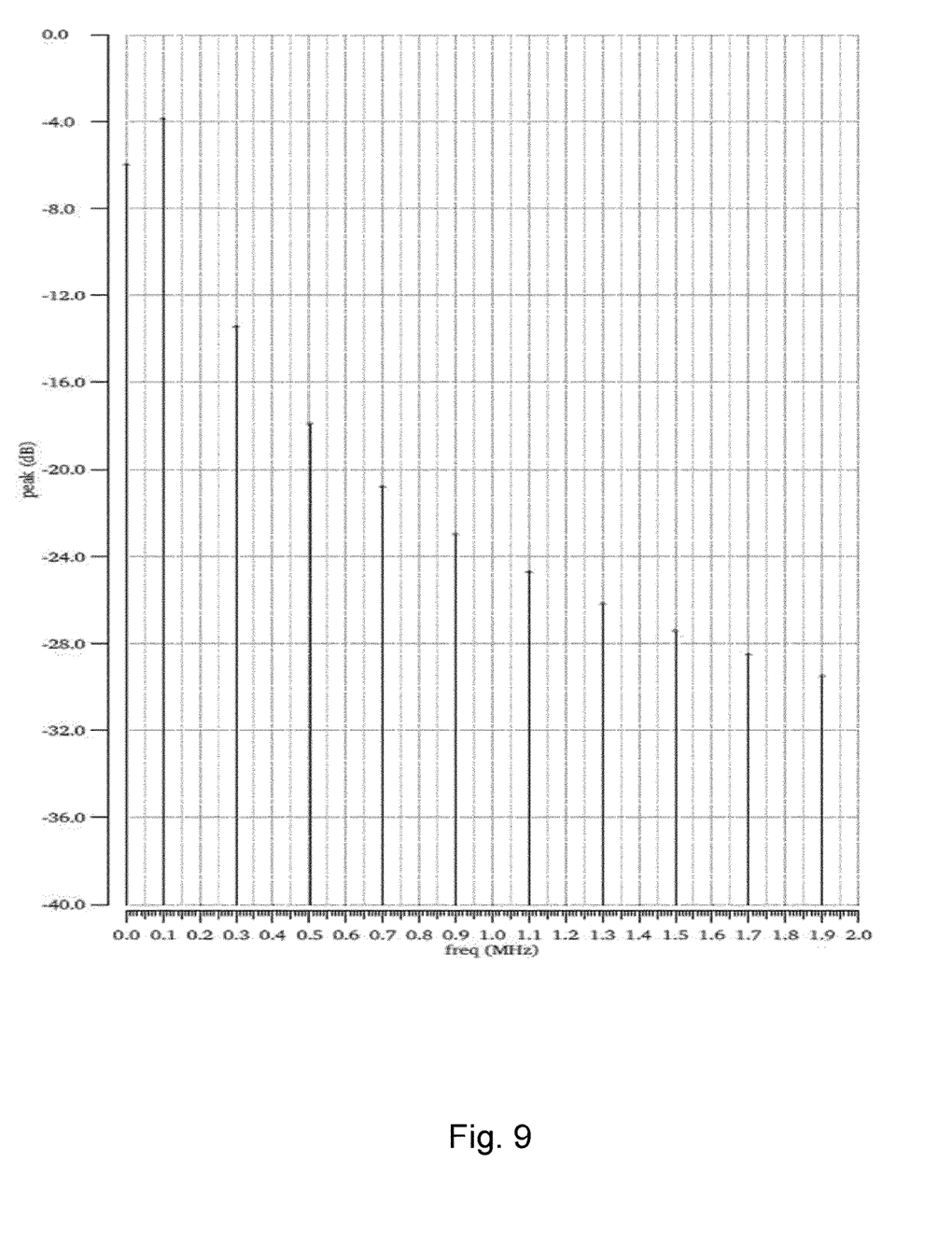
FIG. 9 is a diagram showing the frequency spectrum of a square wave with 50% duty cycle.

For comparison, the spectrum of a plain square wave with 50% duty cycle and the same fundamental frequency of 100 kHz as the waveform in FIG. 6, is shown in FIG. 9. As can be seen the 9th harmonic in this case has much less amplitude, about −23 dB, compared to the fundamental tone of about −3.9 dB.

Figure 10:
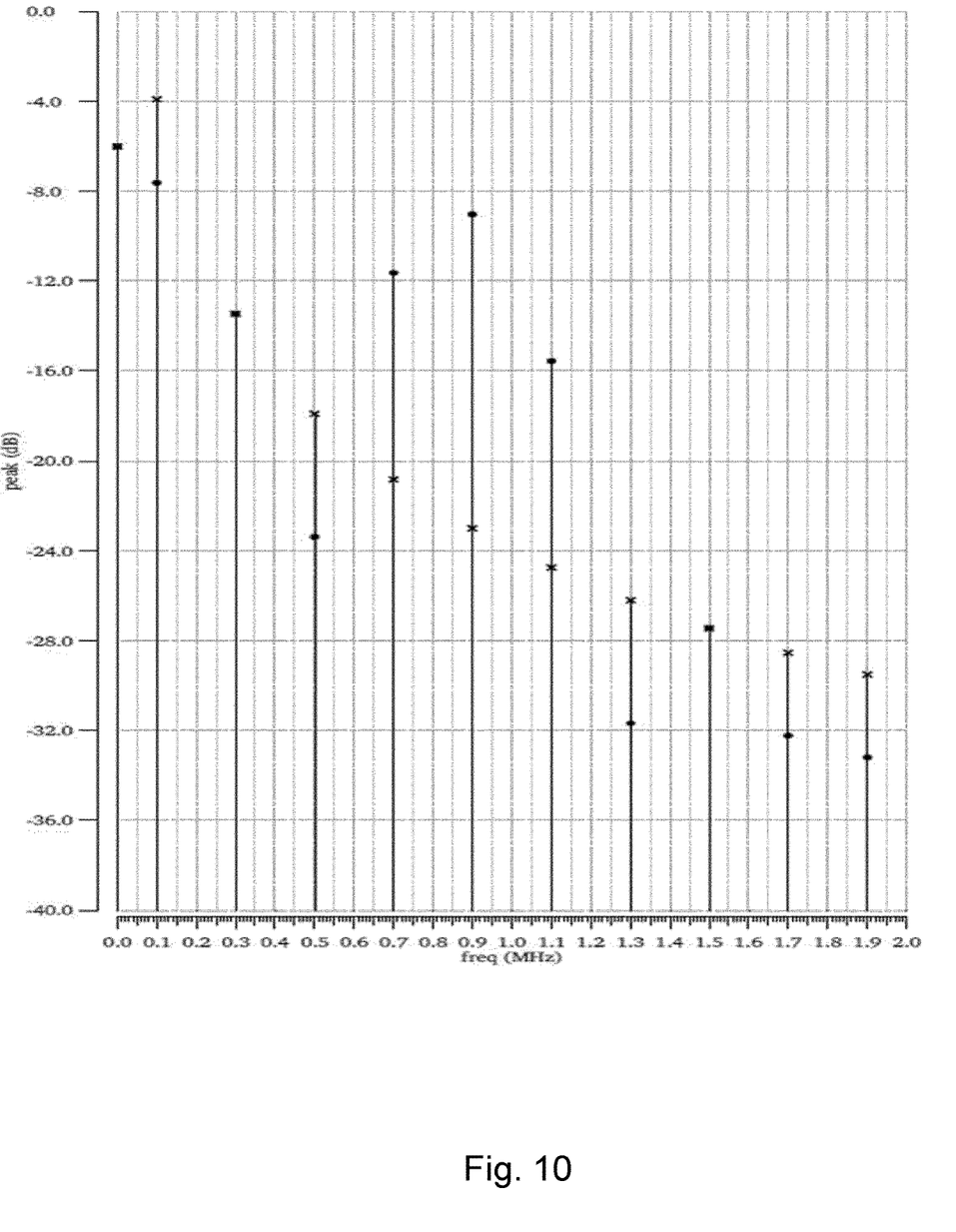
FIG. 10 is a diagram showing the frequency spectrums of FIGS. 8 and 9 together.

FIG. 10 shows the two signal spectrums of FIGS. 8 and 9 together. The spectrums of the waveform in FIG. 6 are marked by circles, and the spectrums of the ordinary square wave are marked by crosses. This facilitates comparison of the amplitudes of the tones in the two waveforms. The fundamental tone power drops from −3.9 dB to −7.6 dB when using the dual tone signal instead of a regular square wave, i.e. a drop by 3.7 dB. At the same time the 9th harmonic increases from −23.0 dB to −9.0 dB, i.e. an increase by 14 dB. It thus has exchanged a drop of 3.7 dB in fundamental tone power for an increase of 14 dB in the 9th harmonic, and is an attractive trade-off.

To summarize, the embodiments herein provide a method performed in a base station to facilitate receiver frequency calibration by transmitting a signal with periodic OOK as a preamble or frequency marker signal. The wakeup receiver performs a frequency sweep to search for frequency marker or preamble signals and calibrates its oscillator frequency to the frequency of the preamble or frequency marker signal. The wakeup receiver may then receive a wakeup signal using the calibrated oscillator. The properties of OOK allow the frequency to be swept without disrupting reception, while filtering the receiver AM-demodulated output to find preamble/marker signal tones. The use of signals transmitted by the base station as frequency markers or preambles allows the receiver to use a free-running oscillator, while still being narrowband for high selectivity. High selectivity may thus be achieved with ultra-low receiver power consumption.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a base station for facilitating frequency calibration of a receiver, the method comprising:
generating a first signal with periodic amplitude-shift-keying (ASK) modulation, wherein the first signal with periodic ASK modulation contains first and second frequency modulation tones;
transmitting the first signal as a calibration signal to the receiver to facilitate frequency calibration of the receiver; and
transmitting a second signal as a wakeup signal to the receiver.

2. The method of claim 1, wherein the second signal is transmitted at the same frequency as the first signal after a time period from the first signal has been transmitted.

3. The method of claim 1, wherein the first signal is a first frequency marker signal and the second signal is transmitted at a frequency offset from the first frequency marker signal.

4. The method of claim 3, further comprising transmitting a second frequency marker signal at a second marker frequency, to support receiver calibration over a larger frequency range.

5. The method of claim 3, wherein the periodic ASK signal is an on-off keying (OOK) signal and generated by replacing each zero crossing in a square wave of the first frequency with a wavelet of a square wave of the second frequency.

6. The method of claim 1, wherein the first signal is transmitted continuously and the second signal is transmitted when a receiver wakeup is to be requested.

7. A method performed in a wakeup receiver, wherein the wakeup receiver has an envelope detector-based architecture and comprises at least:
a frequency down-conversion mixer;
a digitally control oscillator (DCO) configured to generate oscillator signals;
a first filter with programmable bandwidth;
an envelope detector;
a second filter with programmable bandwidth; and
a digital processing and control unit configured to determine if a signal is present and generate a frequency control signal to the DCO and bandwidth control signals to the first and second filters;
the method comprising:
setting the wakeup receiver to a first bandwidth by choosing digital settings of the bandwidth control signals to the first and second filters to receive a first signal, wherein the first signal is a periodic ASK modulation signal and transmitted by a base station for facilitating frequency calibration of the receiver and wherein the first signal with periodic ASK modulation contains first and second frequency modulation tones;
operating the DCO at different frequencies by sweeping digital settings of the frequency control signal;
detecting if there is a signal present for each digital setting of the frequency control signal; and
storing the digital setting of the frequency control signal when a signal is detected.

8. The method of claim 7, further comprising setting the wakeup receiver to a second bandwidth and sweeping the digital settings of the frequency control signal to detect if there is a signal present, wherein the second bandwidth is narrower than the first bandwidth.

9. The method of claim 7, further comprising operating the DCO with the digital setting of the frequency control signal where the first signal is detected to receive a second signal transmitted by a base station as a wake-up signal.

10. The method of claim 7, further comprising operating the DCO with a digital setting offset from the digital setting of the frequency control signal where the first signal is detected to receive a second signal transmitted by a base station as a wake-up signal.

11. The method of claim 7, further comprising operating the DCO with a digital setting calculated from two or more digital settings achieved when two or more of the first signals with different frequencies are detected, to receive a second signal transmitted by a base station as a wake-up signal.

12. A wake-up receiver having an envelope detector-based architecture and comprising:
a frequency down-conversion mixer;
a digitally control oscillator (DCO) configured to generate oscillator signals;
a first filter with programmable bandwidth;
an envelope detector;

a second filter with programmable bandwidth; and a digital processing and control circuit operatively coupled to the DCO, the first filter, the second filter, and the envelope detector, and configured to determine if a signal is present and generate a frequency control signal to the DCO and bandwidth control signals to the first and second filters;

wherein the digital processing and control circuit is further configured to:

set the wake-up receiver to a first bandwidth by choosing digital settings of the bandwidth control signals to the first and second filters to receive a first signal, wherein the first signal is a periodic ASK modulation signal and transmitted by a base station for facilitating frequency calibration of the receiver;

operate the DCO at different frequencies by sweeping digital settings of the frequency control signal;

detect if there is a signal present for each digital setting of the frequency control signal; and store the digital setting of the frequency control signal when a signal is detected.

13. A wireless communication device comprising the wake-up receiver of claim 12.

* * * * *